US012098057B2

(12) United States Patent
Gireddy et al.

(10) Patent No.: US 12,098,057 B2
(45) Date of Patent: Sep. 24, 2024

(54) VALIDATION OF ELEVATOR CALL PASSENGER BOARDING

(71) Applicant: Otis Elevator Company, Farmington, CT (US)

(72) Inventors: Jayapal Reddy Gireddy, Telangana (IN); Ganesh Rajarapu, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1420 days.

(21) Appl. No.: 16/561,601

(22) Filed: Sep. 5, 2019

(65) Prior Publication Data

US 2020/0087108 A1 Mar. 19, 2020

(30) Foreign Application Priority Data

Sep. 14, 2018 (IN) ............................ 201811034754

(51) Int. Cl.
*B66B 1/46* (2006.01)

(52) U.S. Cl.
CPC ...... *B66B 1/468* (2013.01); *B66B 2201/4615* (2013.01); *B66B 2201/4653* (2013.01); *B66B 2201/4676* (2013.01); *B66B 2201/4684* (2013.01)

(58) Field of Classification Search
CPC ............ B66B 1/468; B66B 2201/4653; B66B 1/3461; B66B 2201/4615; B66B 1/2408; B66B 2201/4638; B66B 2201/103; B66B 3/002; B66B 5/0012; B66B 5/0018; B66B 1/3492; B66B 2201/4623; B66B 2201/232; B66B 2201/4607; B66B 1/3453; B66B 2201/4669; B66B 13/22; B66B 13/26; B66B 13/02; B66B 13/16
See application file for complete search history.

(56) References Cited

U.S. PATENT DOCUMENTS

| | | | |
|---|---|---|---|
| 3,421,402 | A | 1/1969 | Musser |
| 5,984,051 | A | 11/1999 | Morgan et al. |
| 6,109,396 | A | 8/2000 | Sirag et al. |
| 6,209,685 | B1 | 4/2001 | Zaharia et al. |

(Continued)

FOREIGN PATENT DOCUMENTS

| | | | |
|---|---|---|---|
| CN | 104760851 | A | 7/2015 |
| CN | 107416620 | A | 12/2017 |

(Continued)

OTHER PUBLICATIONS

Extened European Search Report for application No. 19197027.6-1017, Date of mailing Feb. 28, 2020; 9 pages.

(Continued)

*Primary Examiner* — Marlon T Fletcher
(74) *Attorney, Agent, or Firm* — CANTOR COLBURN LLP

(57) ABSTRACT

Provided are techniques for performing validation of a passenger boarding, where the embodiments include receiving a call request, and detecting beacon information responsive to the call request. The techniques also include validating a boarding status of a passenger that placed the call request based at least in part on the beacon information, and responsive to the validation, transmitting a notification of the boarding status.

16 Claims, 4 Drawing Sheets

(56) References Cited

U.S. PATENT DOCUMENTS

| | | | | |
|---|---|---|---|---|
| 6,382,363 | B1 | 5/2002 | Friedli | |
| 6,397,976 | B1 | 6/2002 | Hale et al. | |
| 6,772,862 | B2 | 8/2004 | Friedli | |
| 6,868,945 | B2 | 3/2005 | Schuster et al. | |
| 7,426,981 | B2 | 9/2008 | Bacellar et al. | |
| 7,500,544 | B2 | 3/2009 | Hakala et al. | |
| 7,552,800 | B2 | 6/2009 | Puskala et al. | |
| 8,151,942 | B2 | 4/2012 | Rusanen et al. | |
| 8,490,754 | B2 | 7/2013 | Amano | |
| 8,525,652 | B2 | 9/2013 | Takeuchi | |
| 8,813,917 | B2 | 8/2014 | Salmikuukka et al. | |
| 8,820,486 | B2 | 9/2014 | Gerstenkorn et al. | |
| 9,580,272 | B2 | 2/2017 | Kappeler et al. | |
| 9,856,107 | B2 | 1/2018 | Haipus et al. | |
| 10,294,071 | B2 | 5/2019 | Simcik et al. | |
| 2008/0011557 | A1 | 1/2008 | Hakala et al. | |
| 2009/0002237 | A1 | 1/2009 | Nonoyama et al. | |
| 2012/0152660 | A1 | 6/2012 | Fujihata et al. | |
| 2016/0207735 | A1 | 7/2016 | Elomaa et al. | |
| 2016/0244295 | A1 | 8/2016 | Salmikuukka | |
| 2016/0340148 | A1 | 11/2016 | Salmikuukka et al. | |
| 2017/0010099 | A1 | 1/2017 | Simcik | |
| 2017/0291792 | A1 | 10/2017 | Scoville et al. | |
| 2018/0099840 | A1* | 4/2018 | Armistead | G05B 19/042 |
| 2018/0118510 | A1* | 5/2018 | Simcik | G06F 3/0484 |
| 2019/0002237 | A1* | 1/2019 | Scoville | B66B 1/468 |
| 2019/0168993 | A1* | 6/2019 | Kuenzi | B66B 1/2458 |
| 2019/0263626 | A1* | 8/2019 | Daniels | B66B 1/468 |
| 2020/0087108 | A1* | 3/2020 | Gireddy | B66B 1/468 |

FOREIGN PATENT DOCUMENTS

| | | | | | |
|---|---|---|---|---|---|
| CN | 107954285 | A | * | 4/2018 | B66B 1/3461 |
| CN | 108483152 | A | | 9/2018 | |
| CN | 109205410 | A | | 1/2019 | |
| CN | 114476883 | A | * | 5/2022 | |
| EP | 0970911 | A2 | | 1/2000 | |
| EP | 3098190 | A1 | * | 11/2016 | B66B 1/06 |
| EP | 3312123 | A1 | | 4/2018 | |
| EP | 3421402 | A1 | * | 1/2019 | B66B 1/14 |
| FR | 2785597 | A1 | * | 5/2000 | B66B 1/468 |
| JP | 2005178927 | A | | 7/2005 | |
| JP | 2010111444 | A | | 5/2010 | |
| JP | 2019516638 | A | * | 6/2019 | |
| JP | 6747626 | B1 | * | 8/2020 | B66B 1/461 |
| KR | 20090078854 | A | * | 7/2009 | |
| WO | WO-2006082273 | A1 | * | 8/2006 | B66B 1/463 |
| WO | WO-2017175019 | A1 | * | 10/2017 | B66B 1/2408 |
| WO | WO-2018213008 | A1 | * | 11/2018 | B66B 1/3461 |
| WO | WO-2020022332 | A1 | * | 1/2020 | H01L 27/14679 |
| WO | WO-2022207242 | A1 | * | 10/2022 | |

OTHER PUBLICATIONS

Office Action issued Jul. 15, 2021 for Chinese Application No. 201811034754.

* cited by examiner

VALIDATION OF ELEVATOR CALL PASSENGER BOARDING

CROSS-REFERENCE TO RELATED APPLICATIONS

This application claims the benefit of Indian Application No. 201811034754 filed Sep. 14, 2018, which is incorporated herein by reference in its entirety.

BACKGROUND

The embodiments disclosed herein relate generally to control systems, and more particularly, to a validating elevator call passenger boarding system and method for use thereof.

In today's environment, elevator systems include many complex components which enable increased functionality of the elevator systems. Elevators are equipped with controllers and various sensors such as cameras, pressure sensors, etc. Also, elevators can include a number of mechanisms to place elevator calls such using call buttons, kiosks, or other techniques. Although a number of techniques exist to place the elevator calls there are no mechanisms to verify that the user that placed the call has boarded the requested elevator.

BRIEF SUMMARY

According to an embodiment, a method for performing validation of a passenger boarding is provided. The method includes receiving, by a processor, a call request, detecting beacon information responsive to the call request, validating a boarding status of a passenger that placed the call request based at least in part on the beacon information, and responsive to the validation, transmitting a notification of the boarding status.

In addition to one or more of the features described herein, or as an alternative, further embodiments include a call request that is an elevator call request.

In addition to one or more of the features described herein, or as an alternative, further embodiments include responsive to detecting the beacon information, starting a timer to verify the passenger has boarded the elevator, wherein the timer delays closing of doors of the elevator.

In addition to one or more of the features described herein, or as an alternative, further embodiments include closing doors of the elevator before the expiration of the timer, and detecting additional beacon information to verify the presence of the passenger on the elevator.

In addition to one or more of the features described herein, or as an alternative, further embodiments include responsive to the boarding status, canceling the elevator call request.

In addition to one or more of the features described herein, or as an alternative, further embodiments include responsive to the boarding status, the elevator services the elevator call.

In addition to one or more of the features described herein, or as an alternative, further embodiments include providing a warning to the passenger responsive to a threshold number of failed validation attempts.

In addition to one or more of the features described herein, or as an alternative, further embodiments include ignoring call requests from the passenger for a period of time responsive to a threshold number of failed validation attempts.

In addition to one or more of the features described herein, or as an alternative, further embodiments include storing a user profile for each passenger including the user ID and the boarding status information.

In addition to one or more of the features described herein, or as an alternative, further embodiments include communicating with a building management system.

According to a different embodiment, a system for performing validation of a passenger boarding is provided. The system includes a beacon device configured to transmit beacons to one or more user devices, and a controller including a processor. The processor is configured to receive a call request, detect beacon information responsive to the call request, validate a boarding status of a passenger that placed the call request based at least in part on the beacon information, and responsive to the validation, transmit a notification of the boarding status.

In addition to one or more of the features described herein, or as an alternative, further embodiments include a beacon device that is installed an elevator car.

In addition to one or more of the features described herein, or as an alternative, further embodiments include beacon device that is configured to continuously transmit beacons until the doors of the elevator car are closed.

In addition to one or more of the features described herein, or as an alternative, further embodiments include responsive to detecting the beacon information, starting a timer to verify the passenger has boarded the elevator, wherein the timer delays closing of doors of the elevator.

In addition to one or more of the features described herein, or as an alternative, further embodiments include closing doors of the elevator before the expiration of the timer, and detecting additional beacon information to verify the presence of the passenger on the elevator.

In addition to one or more of the features described herein, or as an alternative, further embodiments include responsive to a boarding status, wherein the controller is configured to cancel the elevator call request.

In addition to one or more of the features described herein, or as an alternative, further embodiments include providing a warning to the passenger responsive to a threshold number of failed validation attempts.

In addition to one or more of the features described herein, or as an alternative, further embodiments include a controller is further configured to ignore call requests from the passenger for a period of time responsive to a threshold number of failed validation attempts.

In addition to one or more of the features described herein, or as an alternative, further embodiments include storing a user profile for each passenger including the user ID and the boarding status information.

In addition to one or more of the features described herein, or as an alternative, further embodiments include communicating with a building management system.

Technical effects of embodiments of the present disclosure include validating an elevator call passenger, after placing an elevator call request, has boarded the requested elevator car and identifying elevator call users to update a profile for the elevator call users.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

In current systems, when an elevator call request is registered to the elevator system, an elevator dispatcher dispatches the car for the elevator call passenger and opens the elevator doors for a pre-configured interval of time. Then, the elevator call request is serviced by traveling to the registered destination irrespective of the requesting passenger boarding the elevator. This can lead to unnecessary servicing of elevator calls without passengers, particularly in the event there are no other calls from a different destination entry system for the particular car. Currently, there are no mechanisms implemented to validate whether an elevator call passenger has successfully boarded the requested elevator or not. Even further there are no means of identifying ghost elevator calls registration and preventing users from placing elevator call requests for a period of time.

The techniques described herein provide a mechanism to validate the elevator call passenger has boarded the requested elevator car by using a beacon device to detect the location of the passenger. In addition, a passenger history can be used to block passengers that have placed a threshold number of ghost calls (inadvertent elevator calls) or nuisance calls without boarding the elevator.

Figure 1:
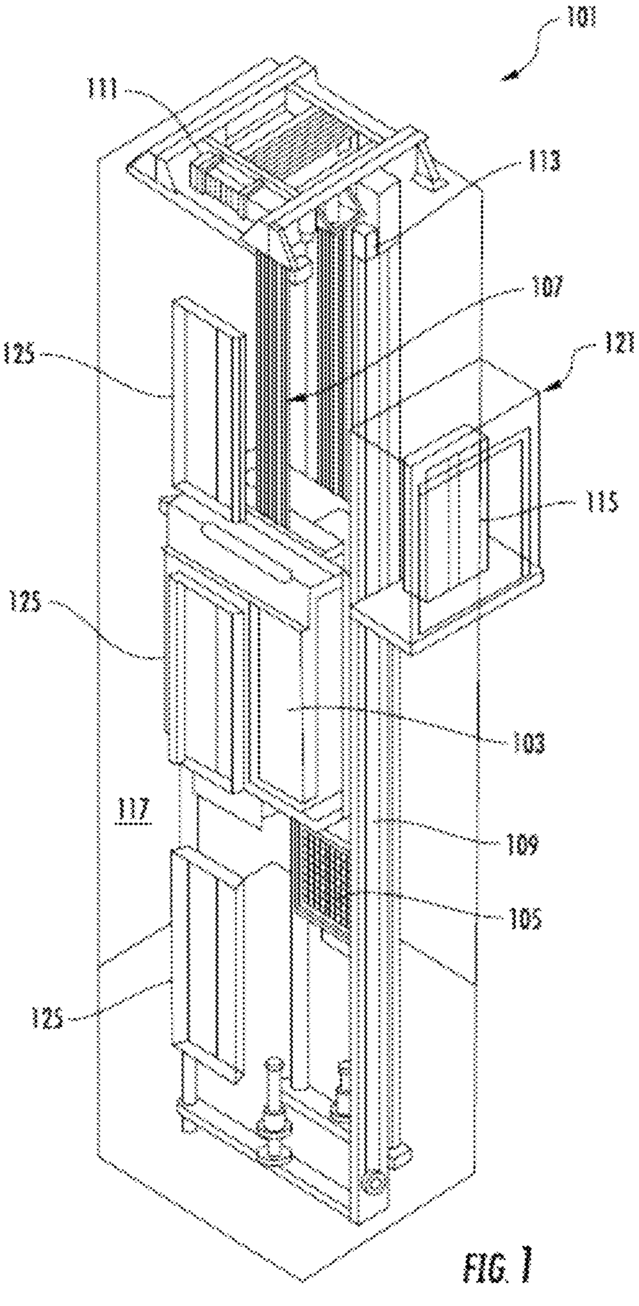
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
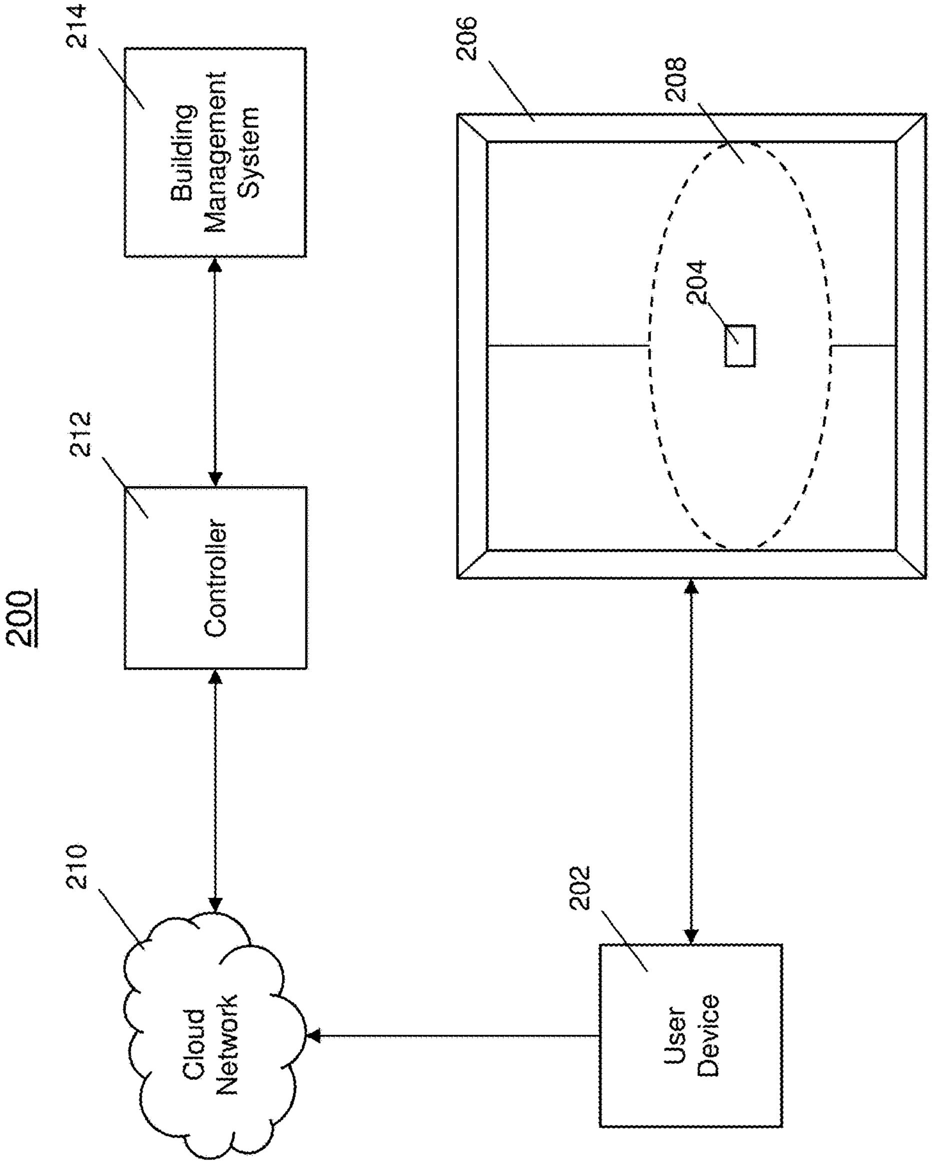
FIG. 2 depicts an example architecture of the system in accordance with one or more embodiments.

In FIG. 2, a system 200 for performing validation of a passenger boarding in accordance with one or more embodiments is shown. As shown, the system 200 includes a user device 202 that is a mobile device such as a tablet or mobile phone. The user device 202 is configured to transmit an elevator call request to obtain elevator service. The user device 202 can have an application installed on the user device 202, where each elevator call user using the user device 202 is associated with an elevator call user ID. The elevator call application installed on the user device 202 is configured to detect a beacon from a beacon device 204 installed in an elevator 206. Although an elevator 206 is shown in this example, it is to be understood the techniques described herein can be applicable to other applications. The beacon device 204 is configured to transmit a beacon having a configurable radius 208. In one or more embodiments, the signal strength of the beacon device 204 can be configured to the desired radius to limit the beacons access to one or more elevator cars. In other embodiments, multiple beacon devices can be positioned in the elevator cars in a different configuration. In one or more embodiments, each elevator car 206 is equipped with a beacon device 204. Although only a single elevator car 206 is shown, it should be understood that a plurality of elevator cars 206 can be included in the system 200. The beacon device 204 can be a Bluetooth device and is configured to continuously transmit the beacon to a mobile device. The beacon device 204 can be installed in each elevator car of the elevator group.

Responsive to detecting the beacon, the user device 202 can transmit a passenger status to a controller 212 through a cloud network 210, indicating to the system 200 that the elevator call user is located inside of the elevator 206. In addition, the direction of a passenger can be detected. A passenger that is traveling towards the elevator car 206 can be determined by the elevator call application detecting a sequence of the signal strength of the beacons. For example, if the sequence indicates the measured signal strength is increasing the passenger is approaching the elevator car 206. If the sequence of the measured signal strength of the beacons is decreasing the passenger is moving away from the elevator car 206.

The controller 212 of the system 200 can be an elevator controller such as that shown in FIG. 1. The controller 212 is operably coupled to the elevator 206 and building management system (BMS) 214 and is configured to communicate with the BMS 214. The BMS 214 can store profiles for the elevator call users which includes the user ID, the user status for each elevator call request, such as boarded/not boarded and traveled/not traveled. The profile information can be used to determine whether the elevator call user is placing ghost calls or has successfully boarded and traveled on the elevator car 208 per the elevator call request. In the event, a threshold number of ghost calls has been detected for the user, the controller 212 can disable or ignore the elevator call request from the user for a configurable period of time. In one or more embodiments, the controller 212 is configured to cancel an elevator call request for an elevator car 206 responsive to detecting a threshold number of ghost calls from a user, where the user is the only one requesting the elevator car 206. This avoids canceling the elevator calls for other valid passengers.

In addition, the controller 212 is configured to send a notification to a user device 202 regarding the ghost calls prior to blocking the user for a configurable time interval responsive to detecting a threshold number of ghost calls. For example, a passenger that is continuously placing ghost calls, that is intentionally repeating calls but not boarding the elevator (nuisance calls), the elevator call user can be blocked by the BMS for a period of time. If the same elevator call user is identified after 2 or 3 failed attempts, the BMS can identify and flag the elevator call user's profile. In one or more embodiments, if the elevator call user places multiple elevator call requests above a configurable threshold, the elevator call requests from the user are considered ghost calls and the elevator call user can be blocked from placing requests for a predefined period of time. For example, the system 200 may allow 3 elevator call requests in a period of 3 minutes, where any calls exceeding the limit can result in the elevator call user getting blocked for a period of time such as 3, 5, or 10 minutes. It should be understood that other thresholds and timeout periods can be used.

In the event an elevator call user is detected, the elevator call user information is updated at the BMS 214 with a successful boarding status. In one or more embodiments, the beacon device 204 can be configured to continuously transmit the beacon until the doors of the associated elevator car 206 have closed. This ensures that the elevator call user has in fact boarded the elevator 206. After the doors are closed, the user information can be updated to the BMS 214.

Figure 3:
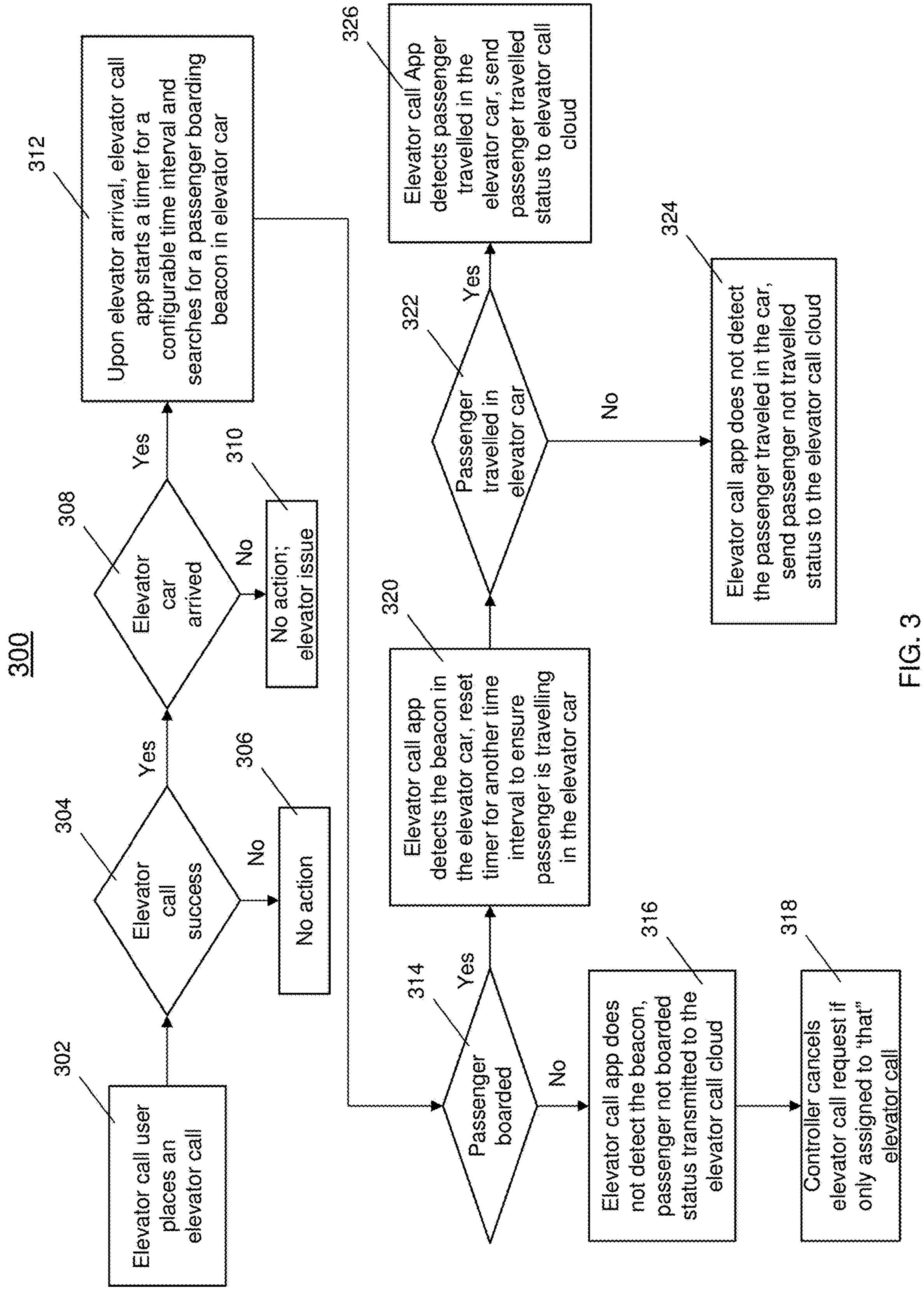
FIG. 3 depicts a flowchart of a method for validating elevator call passenger boarding in accordance with one or more embodiments.
Figure 4:
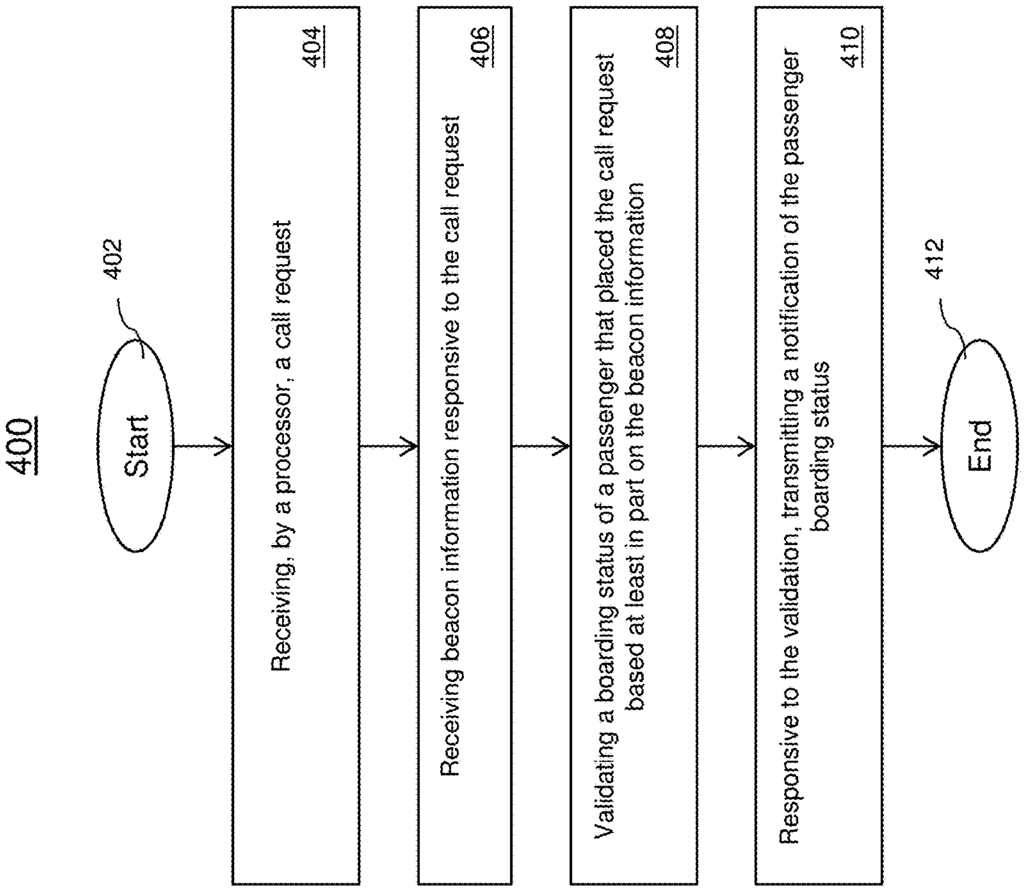
FIG. 4 depicts another flowchart of a method for validating elevator call passenger boarding in accordance with one or more embodiments.

In FIG. 3, a flowchart of method 300 for validating an elevator call passenger has boarded in accordance with one or more embodiments. The method 300 can be implemented in the systems of FIGS. 1 and 2. At block 302, an elevator call user, using a mobile device with an elevator call application installed, places an elevator call. At decision block 304, the method 300 determines whether the elevator call is successful. If not ("No" branch), the process ends at block 306 and no action is taken. Otherwise ("Yes" branch), at decision block 308, it is determined whether the elevator car has arrived. If not ("No" branch), no further action is taken and an elevator issue may exist as shown in block 310. Otherwise ("Yes" branch), the method 300 proceed to block 312 where upon the arrival of an elevator, the elevator call app starts a timer for a configuration time interval and searches for a passenger boarding beacon in the elevator car.

The method 300 proceeds to decision block 314 which determines whether the passenger has boarded the elevator car. If not ("No" branch), at block 316 the elevator call app does not detect the beacon and a passenger not boarded status is transmitted to the elevator call cloud. Next, at block 318 the controller cancels the elevator call request if it is the only elevator call request for the elevator. Otherwise ("Yes" branch), at block 320 the elevator call app detects the beacon in the elevator car and resets the timer for a time interval to ensure the passenger is travelling in the elevator car. The method 300 proceeds to decision block 322 and determines whether a passenger traveled in the elevator car. If not ("No" branch), at block 324 the elevator call application does not detect the passenger traveled in the car and sends passenger not traveled status to the elevator call cloud. Otherwise ("Yes" branch), at block 326 the elevator call application detects the passenger has traveled in the elevator car and send passenger traveled status to the elevator call cloud.

FIG. 400 depicts a flowchart of a method for validating that an elevator call passenger has boarded in accordance with one or more embodiments. The method 400 can be implemented in the systems of FIGS. 1 and 2. The method 400 begins at block 402 and proceeds to block 404 which provides for receiving a call request. The method 400 proceeds to block 406 and includes receiving beacon information responsive to the call request. In one or more embodiments, the beacon information can be received by an application of the user device and transmitted to the cloud and controller to indicate a user device ID and a location of the user device which is used to determine whether the user has boarded. The method 400, at block 408, further includes validating a boarding status of a passenger that placed the call request based at least in part on the beacon information. At block 410, the method 400 provides for responsive to the validation, transmitting a notification of the passenger boarding status. In one or more embodiments, the notification indicates a boarded/not boarded status. Also, the notification can be transmitted to the user device to provide a warning for placing a threshold number of ghost calls or that the user has been blocked from placing elevator calls for a period of time. The notification can be transmitted to a BMS system to store a profile history for each of the elevator call users. The method 400 ends at block 412.

The technical effects and benefits include validation elevator call requests using beacon devices to detect whether the elevator call passenger has boarded. The technical effects and benefits include communicating with a BMS to process data related to successful and unsuccessful elevator call requests. In addition, ghost calls can be tracked and the user's access to placing elevator call can be managed and blocked for a period of time. The technical effects and benefits also include improved passenger experience by increasing the availability of the elevator cars.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for performing validation of a passenger boarding, the method comprising:

receiving, by a processor, a call request;

detecting beacon information responsive to the call request;

validating a boarding status of a passenger that placed the call request based at least in part on the beacon information; and responsive to the validation, transmitting a notification of the boarding status;

wherein the call request is an elevator call request;

wherein validating the boarding status further comprises responsive to detecting the beacon information, starting a timer to verify the passenger has boarded the elevator, wherein the timer delays closing of doors of the elevator.

2. The method of claim 1, further comprising closing doors of the elevator before the expiration of the timer; and detecting additional beacon information to verify the presence of the passenger on the elevator.

3. The method of claim 1, further comprising responsive to the boarding status, canceling the elevator call request.

4. The method of claim 1, further comprising responsive to the boarding status, the elevator services the elevator call.

5. The method of claim 1, wherein transmitting the notification comprises providing a warning to the passenger responsive to a threshold number of failed validation attempts.

6. The method of claim 1, further comprising ignoring call requests from the passenger for a period of time responsive to a threshold number of failed validation attempts.

7. The method of claim 6, further comprising storing a user profile for each passenger comprising the user ID and the boarding status information.

8. The method of claim 7, further comprising communicating with the building management system.

9. A system for performing validation of a passenger boarding, the system comprising:

a beacon device configured to transmit beacons to one or more user devices;

a controller comprising a processor configured to:

receive a call request;

detect beacon information responsive to the call request;

validate a boarding status of a passenger that placed the call request based at least in part on the beacon information; and responsive to the validation, transmit a notification of the boarding status;

wherein the beacon device is installed an elevator car;

wherein to validate the boarding status, the controller is further configured to, responsive to detecting the beacon information, start a timer to verify the passenger has boarded the elevator, wherein the timer delays closing of doors of the elevator.

10. The system of claim 9, wherein the beacon device continuously transmits beacons until the doors of the elevator car are closed.

11. The system of claim 9, wherein the controller is further configured to close doors of the elevator before the expiration of the timer; and detect additional beacon information to verify the presence of the passenger on the elevator.

12. The system of claim 9, further comprising responsive to the boarding status, wherein the controller is configured to cancel the elevator call request.

13. The system of claim 9, wherein transmitting the notification comprises providing a warning to the passenger responsive to a threshold number of failed validation attempts.

14. The system of claim 9, wherein the controller is further configured to ignore call requests from the passenger for a period of time responsive to a threshold number of failed validation attempts.

15. The system of claim 14, further comprising storing a user profile for each passenger comprising the user ID and the boarding status information.

16. The system of claim 15, further comprising communicating with the building management system.

* * * * *